United States Patent
Reinhart (10) Patent No.: US 6,679,990 B2
(45) Date of Patent: Jan. 20, 2004

(54) CARTRIDGE FILTER WITH INTEGRATED THREADING HAVING ANTI-ROTATION FEATURE

(75) Inventor: David Matthew Reinhart, Mt. Holly, NC (US)

(73) Assignee: Dana Corporation, Toledo, OH (US)

( * ) Notice: Subject to any disclaimer, the term of this patent is extended or adjusted under 35 U.S.C. 154(b) by 188 days.

(21) Appl. No.: 09/917,721

(22) Filed: Jul. 31, 2001

(65) Prior Publication Data

US 2003/0024870 A1 Feb. 6, 2003

(51) Int. Cl.$^7$ ................................................ B01D 35/30
(52) U.S. Cl. ........................ 210/232; 210/440; 210/442; 210/450; 210/457; 210/DIG. 17
(58) Field of Search ........................... 210/91, 232, 440, 210/442, 443, 444, 457, DIG. 17, 450

(56) References Cited

U.S. PATENT DOCUMENTS

| | | | |
|---|---|---|---|
| 4,299,699 A | 11/1981 | Boogay | |
| 4,626,348 A | 12/1986 | Stone | |
| 6,139,738 A | 10/2000 | Maxwell | |
| 6,481,580 B1 * | 11/2002 | Amstutz et al. | ............ 210/440 |

FOREIGN PATENT DOCUMENTS

| | | | |
|---|---|---|---|
| BE | 1 011 567 A | 11/1999 | |
| DE | 90 16 239 U | 2/1991 | |

* cited by examiner

Primary Examiner—Matthew O. Savage
(74) Attorney, Agent, or Firm—Liniak, Berenato & White (57) ABSTRACT

A filter assembly includes a bowl assembly and a head member enclosing a filter cartridge. A filter center tube is permanently fixed to the bowl but allowed to rotate within a pocket in the bottom of the bowl. The top of the center tube is threaded for fastening to a stud on the filter mounting head. The center tube cannot be threaded onto the stud without the filter assembled over the center tube and into the bowl. In order to assemble the bowl to the head, the operator must turn the outside of the bowl. If a filter is not present, the bowl will turn independently of the center tube and no torque is transmitted to the threads. When the filter is properly installed, a series of tabs or features spaced around the inner perimeter of the wall of the bowl interlock with corresponding grooves or features in the outside diameter of the end cap of the filter. Tabs or features on the outer diameter of the center tube also interlock with grooves or features in the inside diameter of the end cap. The interlocking arrangement on the outside diameter and inside diameter of the end cap forms a lock that then allows torque transmission from the bowl, through the end cap, to the center tube. This arrangement permits the threads to engage and the bowl assembly to be installed.

8 Claims, 7 Drawing Sheets

CARTRIDGE FILTER WITH INTEGRATED THREADING HAVING ANTI-ROTATION FEATURE

BACKGROUND OF THE INVENTION

1. Field of the Invention

The present invention relates generally to fluid filters, and more particularly to replaceable fuel filters and housing assemblies therefor.

2. Description of Related Art

Filters which separate out particulate matter from liquids, as well as liquid contaminants, are well-known in the industry. Such filters are particularly useful for diesel fuel, where water is removed from the diesel fuel passing through the filter to increase the combustion efficiency of the engine. Such fuel filters are also useful with gasoline, oil and other liquid fuels.

A number of such filters include cup-shaped collection bowls located below the filter media to collect the liquid contaminants, whereby a collection bowl with a threaded upper end is removably connected to the housing or casing of a filter cartridge. The filter cartridge includes a ring of appropriate filtration media bounded by upper and lower end caps. Particles in the fuel flowing through the filter media are separated out in the media, while the liquid contaminants collect on the surface of the media, and drop down into the attached collection bowl. The collection bowl is transparent to allow monitoring of the liquid level and includes a drain to allow removal of the liquid contaminants when appropriate.

One technique for attaching the collection bowl to the cartridge is to include a ring-shaped member supported by a radially in-turned portion of the cartridge casing, where the ring-shaped member includes an annular portion with radially-outward directed threads. The collection bowl, with radially inward directed threads, is then easily screwed onto or off of the filter member. Radial flow passages in the ring-shaped member fluidly connect a peripheral cavity in the casing, that is, between the casing and the outer surface of the filter media, with the attached collection bowl, such that liquid contaminants can pass radially-inward through the passages and then downwardly into the attached collection bowl.

Another known filter has a similar structure, whereby the ring-shaped member has radially-inward directed threads, and the collection bowl has radially-outward directed threads.

In some instances, the casing of the filter cartridge is designed to be spun onto a filter head, and includes an upper tap plate with a series of peripheral openings fluidly connected with the peripheral cavity, and a central opening fluidly connected with the central cavity of the element. The openings direct fluid into and out of the filter.

The above filters have received widespread acceptance in the marketplace as providing reliable, efficient devices for separating particles and liquid contaminants from fuel. Unfortunately, one of the limitations of some of the above filters is that the filter cartridge cannot be removed from the casing of the filter. This requires the entire filter cartridge and casing to be disposed of when the media is spent, which can raise environmental issues. The collection bowl is typically the only re-usable component as it can be screwed onto and off of the cartridge when the cartridge is replaced.

On the other hand, providing a filter where the cartridge can be easily removed from the casing also raises issues. For example, it is possible that an end user or repair person can forget to install or re-install a fresh cartridge, and thereby operate the engine without proper filtration. It can also be confusing as to the correct type of filter cartridge used in the filter, and a user or repair person may attempt to install an incorrect cartridge in the casing. This can all have a serious effect on the operation of the internal combustion engine.

Thus, it is believed there is a demand in the industry for a filter including a filter cartridge and attached collection bowl, whereby the filter cartridge is removable from the filter casing but where the filter cannot be assembled or used without a proper filter cartridge installed.

It is also believed there is a continual demand for new and unique filters with removable collection bowls which are easy and cost-effective to manufacture and assembly and provide efficient separation of particles and liquid contaminants in fuel flowing through the filter.

SUMMARY OF THE PRESENT INVENTION

The present invention provides a novel and unique filter, where a filter cartridge must be present within the casing of the filter in order that the collection bowl can be attached and the filter used in a fuel system. The filter cartridge must also have a special anti-rotation feature in order that the collection bowl can be screwed onto the cartridge. This allows control over the type of filter cartridge used within the filter and prevents the use of the filter without a cartridge. The filter is simple and cost-effective to manufacture and assemble, and provides efficient separation of particles and liquid contaminants from fuel passing through the cartridge.

According to the preferred embodiment of the present invention, the filter includes a casing enclosing a removable filter cartridge. The filter cartridge includes a ring of filter media circumscribing a central cavity and having upper and lower ends.

The invention incorporates a filter center tube into the housing or bowl. The center tube is permanently fixed to the bowl but allowed to rotate within a pocket in the bottom of the bowl. The top of the center tube is threaded for fastening to a stud on the filter mounting head. The top has a sealing collar disposed outside of the bowl including a sealing ring that is drawn into the filter mounting head when the center tube is threaded onto the stud.

With this invention, the center tube cannot be threaded onto the stud without the filter assembled over the center tube and into the bowl. In order to assemble the bowl to the head, the operator must turn the outside of the bowl. If a filter is not present, the bowl will turn independently of the center tube and no torque is transmitted to the threads.

When the filter is properly installed, a series of tabs or features spaced around the inner perimeter of the wall of the bowl interlock with corresponding grooves or features in the outside diameter of the end cap of the filter. Tabs or features on the outer diameter of the center tube also interlock with grooves or features in the inside diameter of the end cap. The interlocking arrangement on the outside diameter and inside diameter of the end cap forms a lock that then allows torque transmission from the bowl, through the end cap, to the center tube. This arrangement permits the threads to engage and the bowl assembly to be installed.

As such, the present invention provides a novel and unique filter, which includes a filter casing with a removable filter cartridge, and a removable collection bowl. The filter requires a filter cartridge to be present the filter in order that the collection bowl can be attached and the filter used, and provides control over the type of filter cartridge located in the filter. The filter is simple and cost-effective to manufacture and assemble, and provides efficient separation of particles and liquid contaminants from fuel in the fuel system.

Further features and advantages of the present invention will become apparent to those skilled in the art upon reviewing the following specification and attached drawings.

DETAILED DESCRIPTION OF THE PREFERRED EMBODIMENT

Figure 1:
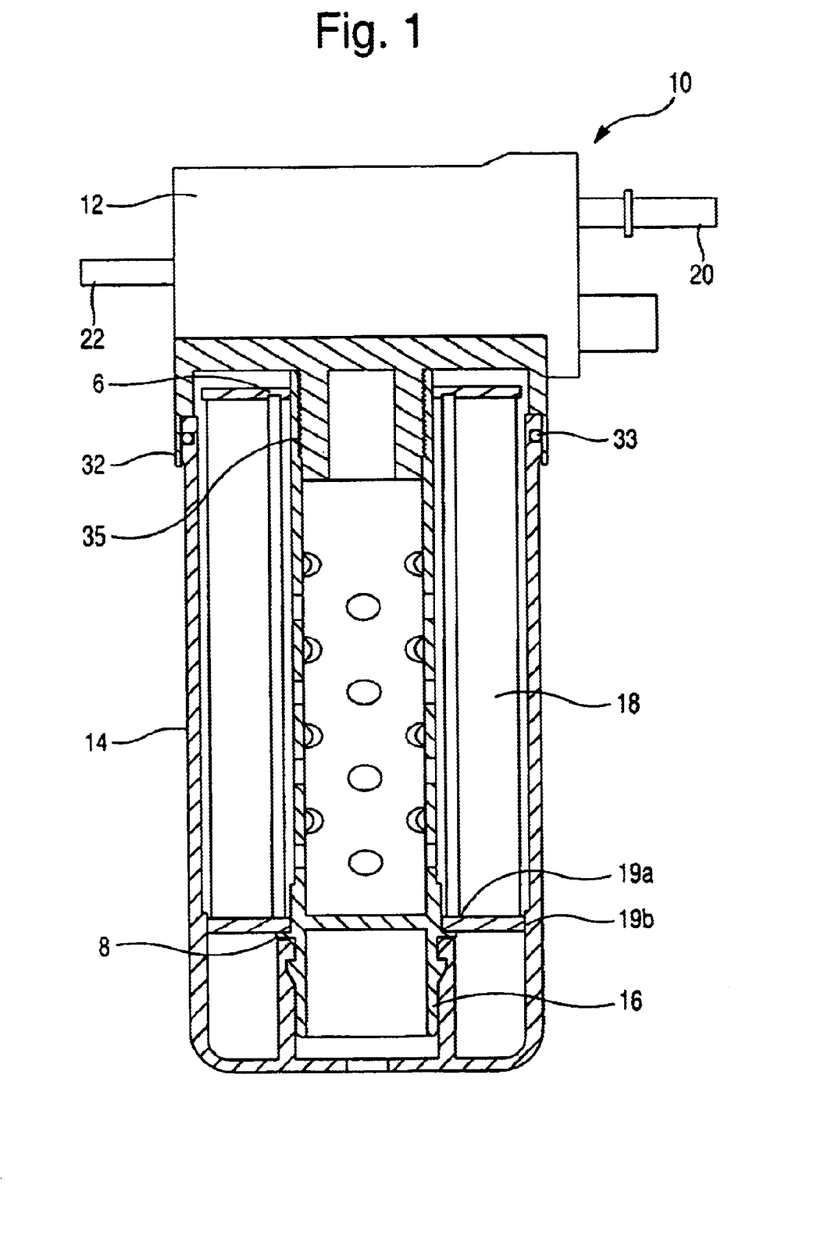
FIG. 1 is a cross-sectional side view of the filter assembly of this invention showing a filter cartridge in the filter.

Referring to the drawings, and initially to FIG. 1, a filter constructed according to the principles of the present invention is indicated generally at 10. The filter 10 includes a filter head or manifold 12, a bowl assembly 14, a slip center tube 16, and a removable filter cartridge 18.

The filter head 12 includes inlet passages 20 (from e.g., the tank) and outlet passages 22 (to e.g., a transfer pump and then to the fuel injectors) for directing fuel into and out of the filter. The inlet and outlet passages are used depending upon the plumbing of the system. Unused passages are typically plugged. The inlet passages provide fuel to be filtered to the peripheral region of the casing, while outlet passages draw filtered fuel from the central region of the casing. A primping pump (not shown) is provided in the inlet passages 20 to push fuel through the filter after an element change. A temperature sensor, vacuum switch and pressure sensor can be mounted in the inlet, outlet and/or return passages for appropriate control and sensing of the fuel flowing through the filter head.

Figure 2:
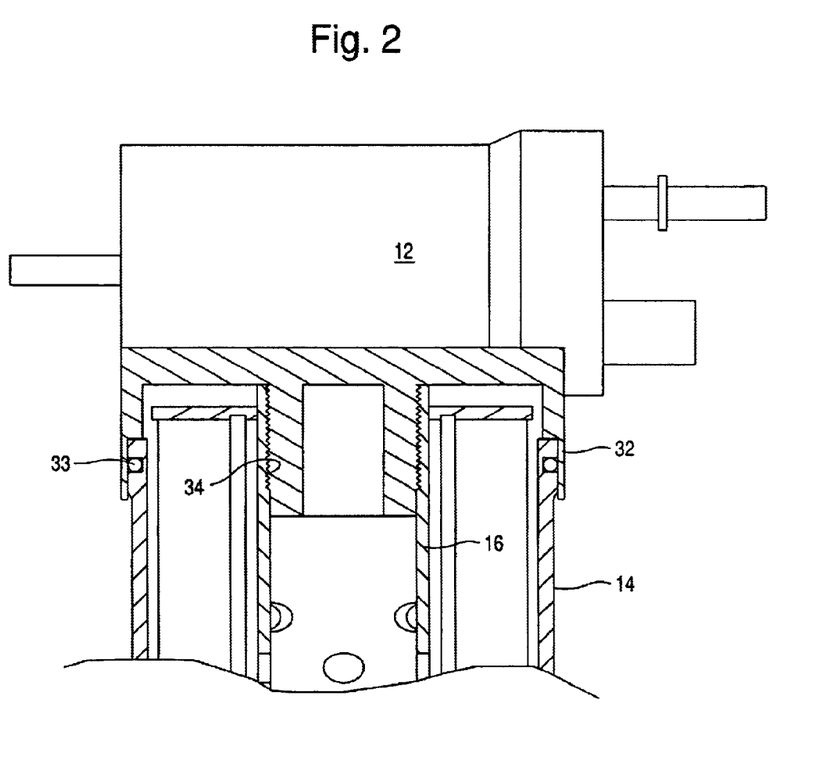
FIG. 2 is an enlarged, partially cross-sectioned view of an upper portion of the filter assembly of FIG. 1.

Referring now to FIG. 2, filter head 12 further includes a cylindrical sealing collar 32 extending axially downward whereby an outside diameter seal 33 is interposed between the upper rim of the bowl assembly 14 and the sealing collar 32. Inside diameter radial seals 6, 8 are provided at each end of the filter 18 to maintain a proper flow through the filter assembly (see FIG. 1).

Figure 3:
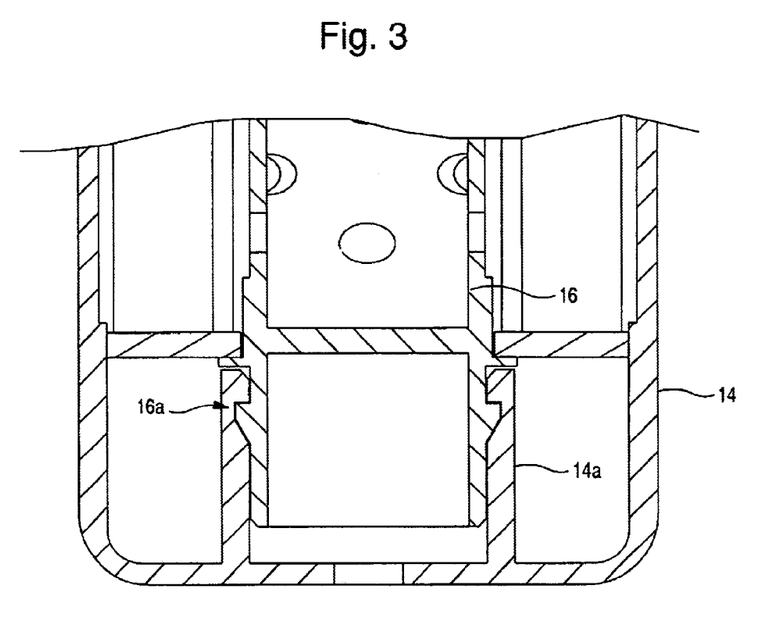
FIG. 3 is an enlarged, partially cross-sectioned view of a lower portion of the filter assembly of FIG. 1.

With reference to FIG. 3, attachment of the center tube 16 to the bowl assembly 14 is accomplished by a one-time snap fit interlock 16a into a high stiffness pocket 14a formed in the bowl assembly 14. The pocket 14a is slotted to permit the drainage of liquid; however, the drain itself is omitted for clarity. Significantly, the center tube 16 is permitted to rotate within the pocket 14a. In other words, the center tube 16 rotates relative to the bowl assembly 14 but it cannot be removed from the pocket 14a due to the snap-fit interlock 16a. As will be described below, a separate clutch arrangement locks the center tube 16 to the bowl assembly 14.

It is noted that this invention should not be limited to the snap-fit interlock illustrated in the accompanying drawings; instead, the invention may comprises a center pin or other attachment mechanism that permits the center tube 16 to rotate within the housing or bowl assembly 14.

Figure 4:
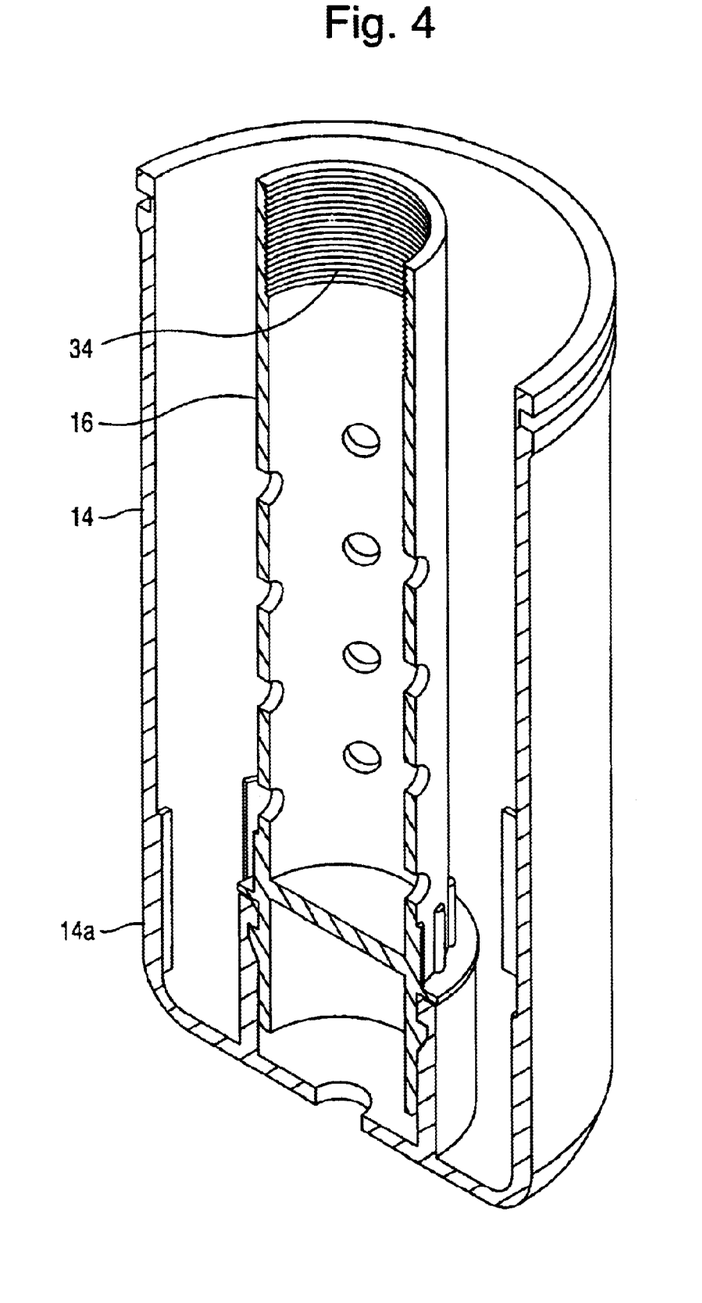
FIG. 4 is a partial cross-section view of the bowl assembly and center tube of the filter assembly of FIG. 1.

Referring now to FIG. 4, the center tube 16 includes a series of radially-inward directed threads 34, and the filter head 12 includes a series of cooperating radially-outward directed threads 35 (see FIG. 1) which enable the filter head 12 to be screwed onto and off of the bowl assembly 14 via the center tube 16 as described below. In accordance with this invention, the bowl assembly 14 cannot be assembled to the filter head 12 unless the filter 18 is properly disposed in the bowl assembly 14. If assembly is attempted without a filter 18 (or with an improper filter), the center tube 16 will rotate in the pocket 14a and thus it will not transmit torque to the threads 34, 35.

The filter head 12 is preferably formed from an appropriate material suitable for the particular application, for example metal, and is formed using conventional techniques, such as die-casting. Casing and collection bowl assembly 14 is also preferably formed of a material which is appropriate for the particular application, for example, a hard opaque plastic. The filter 18 is formed of Nylon 6/6 end caps, Viton inside diameter sealing gaskets, polyamide pleat stabilizing wrap and a phenolic coated, cellulose and 10 micron polyester blended filter media.

Figure 5:
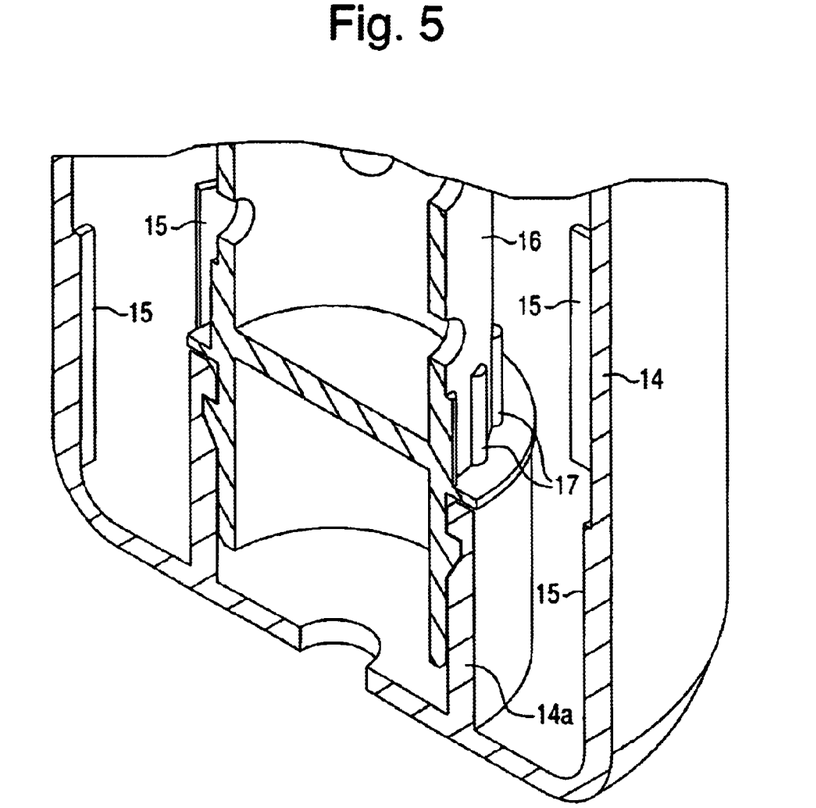
FIG. 5 is an enlarged, partially cross-sectioned view of the clutch assembly including the locking tabs of the filter assembly of the present invention.
Figure 6:
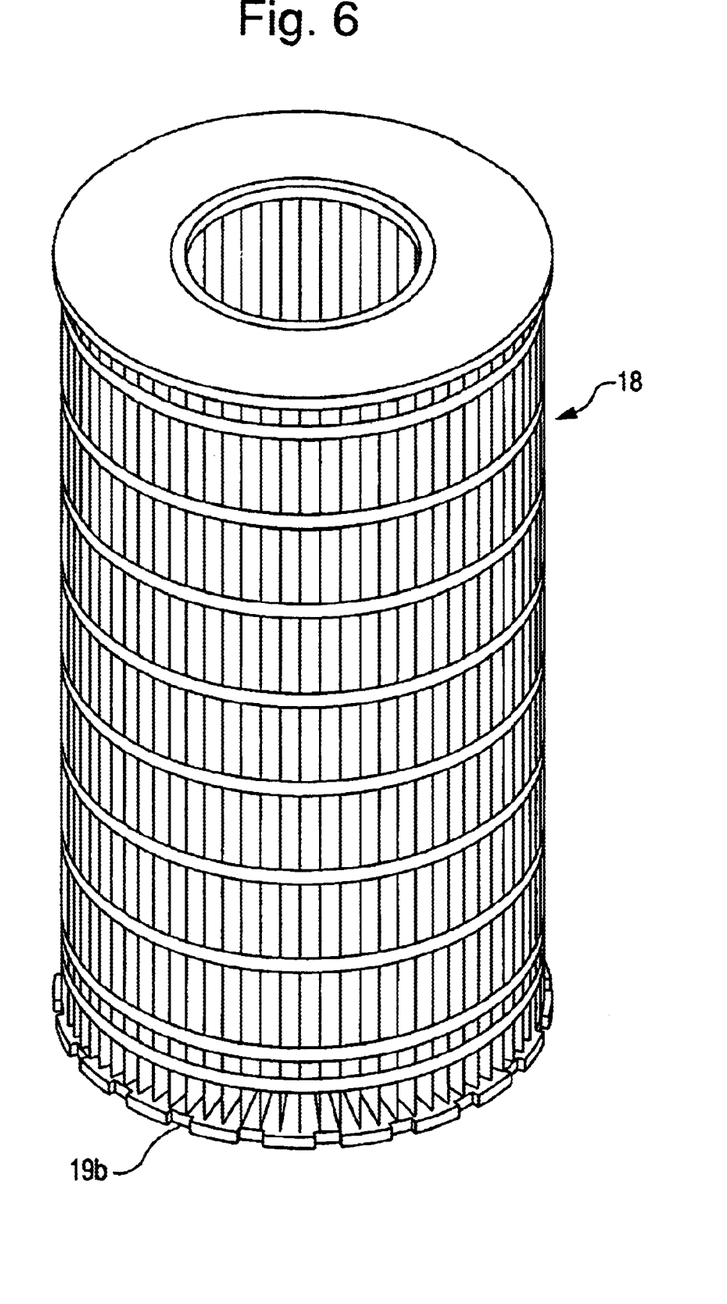
FIG. 6 is a perspective view of the filter.
Figure 7:
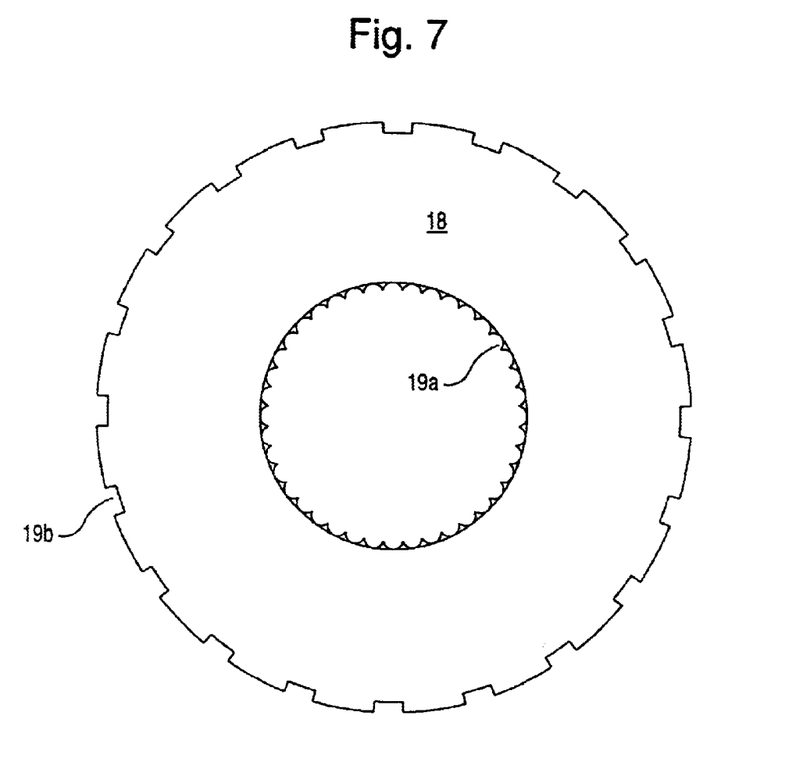
FIG. 7 is a bottom view of the filter of FIG. 6 showing the interior and exterior locking tabs or splines.

Referring now to FIGS. 5 and 6, the clutch interlock arrangement, that locks the center tube 16 relative to the bowl assembly, will now be described. The center tube 16 is provided with modified splines 17 along an outer diameter above the pocket 14a. Although the drawings show several splines 17, the exact number can be varied without departing from or changing the protection associated with this invention. In addition, the bowl assembly 14 is provided with a series of locking tabs 15 on the inside of the outermost wall of the bowl assembly 14. With reference to FIGS. 6 and 7, the filter 18 is provided with interior and exterior locking tabs/slots 19a, 19b on the filter end cap. The internally-projecting locking tabs 19a are designed and formed to mate with the externally-facing splines 17 provided on the center tube 16, and the externally-facing locking slots 19b are designed and formed to mate with the tabs 15 formed on the inside of the of the wall of the bowl assembly 14. Of course, the exact location of the two-part locking assembly (e.g. locking tabs 19a, 19b) of the filter 18 may be varied without departing from the spirit and scope of this invention. Likewise, the exact location, number and arrangement of the tabs 15 and splines 17 are design to interact with locking elements 19, 19b to provide a locking clutch assembly between the bowl assembly 14, filter 18 and center tube 16.

During operation of the filter, the fuel enters one of inlet passages and is directed into the peripheral cavity outside the filter 18, and flows radially inward through filter media where particles in the fuel are separated. The filtered fuel than flows out through one of the outlet passages. Liquid contaminants are collected on the outer surface of the filter media, and pass downwardly and inwardly through openings into the attached collection bowl assembly 14.

Thus, as described above, the present invention provides a novel and unique filter having a removable cartridge in a casing, and a removable collection bowl, which requires a specific filter cartridge to be installed within the filter, and which cannot be used if the filter cartridge is absent.

The principles, preferred embodiments and modes of operation of the present invention have been described in the foregoing specification. The invention which is intended to be protected herein should not, however, be construed as limited to the particular form described as it is to be regarded as illustrative rather than restrictive. Variations and changes may be made by those skilled in the art without departing from the scope and spirit of the invention as set forth in the appended claims.

For example, the preferred embodiment shown in the accompanying drawings is a cylindrical housing and filter member; however, the specific shape of the components of this invention should not be limited to the arrangements shown and described herein. The bowl assembly 14, center tube 16 and filter 18 may be formed in any suitable shape to achieve the purposes of this invention.

What is claimed is:

1. A filter assembly comprising:
    a casing having an opening at one end thereof and defining a cavity, said casing including an anti-rotation device disposed on an inner peripheral surface thereof;
    a center tube rotatably supported within said cavity for relative rotation of said center tube with respect to said casing about a central axis, said tube has an anti-rotation device disposed on an outer peripheral surface thereof, said tube is threaded at one end thereof;
    a filter element removably disposed within said casing about said tube, said filter element including a first anti-rotation device cooperating with said anti-rotation device of said casing to rotationally fix said filter element with respect to said casing and a second anti-rotation device cooperating with said anti-rotation device of said tube to rotationally fix said filter element with respect to said tube;
    a mounting head secured to said one end of said casing for sealingly closing said opening therein, said mounting head is threadedly fastened to said one end of said tube.

2. The filter assembly as defined in claim 1, wherein said first anti-rotation device and said anti-rotation device of said tube each include at least one radially outwardly projecting locking tab, and said second anti-rotation device and said anti-rotation device of said casing each include at least one radially inwardly projecting locking tab.

3. The filter assembly as defined in claim 1, wherein said locking tabs are circumferentially spaced-apart from one other around the central axis.

4. The filter assembly as defined in claim 1, further comprising a seal interface between said casing and said mounting head.

5. The filter assembly as defined in claim 1, wherein said center tube comprises flow apertures passing therethrough.

6. The filter assembly as defined in claim 1, wherein said center tube matingly engages said casing while permitting said relative rotation.

7. A filter assembly as defined in claim 1, wherein said center tube, said filter, and said bowl assembly are fixed against relative rotation when said filter is properly positioned within said casing.

8. The filter assembly as in claim 1, wherein said casing is cylindrical.

* * * * *